July 10, 1928.
M. J. TRUMBLE
1,676,675
PROCESS OF RECOVERING LIGHT HYDROCARBONS FROM CARBONACEOUS MATERIAL
Original Filed July 31, 1922
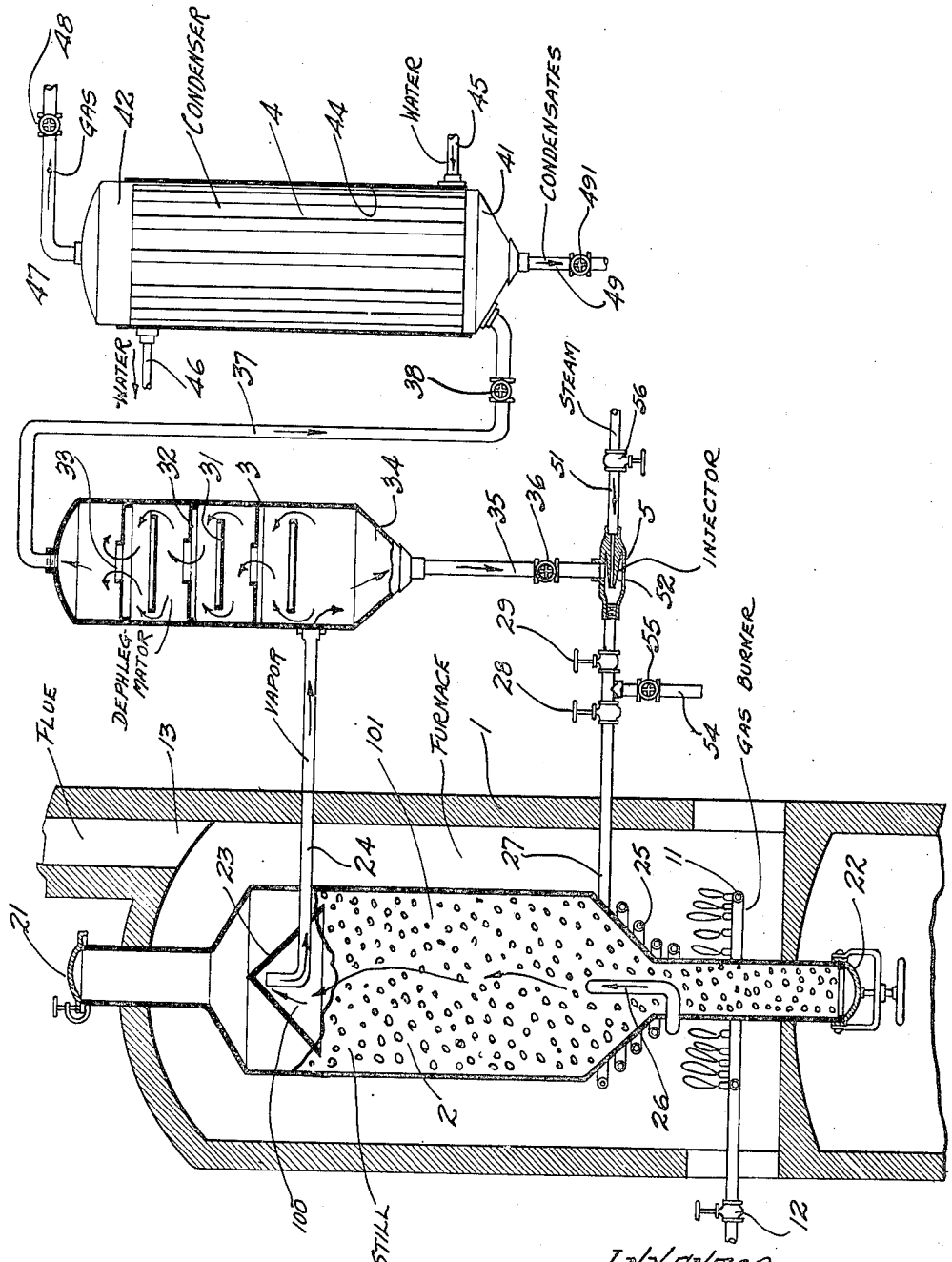
INVENTOR
MILON. J. TRUMBLE
BY,
Graham + Lewis
ATTORNEYS, Patented July 10, 1928.

1,676,675

UNITED STATES PATENT OFFICE.

MILON J. TRUMBLE, OF LOS ANGELES, CALIFORNIA.

PROCESS OF RECOVERING LIGHT HYDROCARBONS FROM CARBONACEOUS MATERIAL.

Original application filed July 31, 1922, Serial No. 578,736. Divided and this application filed April 7, 1924 Serial No. 704,678.

My invention relates to the art of recovering light hydrocarbons from coal, lignite, peat, oil, sands, oil shales or other carbonaceous materials.

The principal object of the invention is to provide a process by which these materials may be treated to produce oil which is extremely volatile and of high value.

Further objects and advantages will be made evident hereinafter.

Referring to the diagrammatic illustration shown in the annexed drawing, 1 is a furnace, 2 is a still, 3 is a dephlegmator, 4 is a condenser, and 5 is an injector.

The furnace 1 is provided with a gas burner 11 controlled by a valve 12 and the furnace 1 also has a flue 13. The still 2 consists of a tight shell having a cover 21 at the upper end and a cover 22 at the lower end, these covers being readily removable but so constructed that they will retain high pressures when closed. The still 2 is also constructed so that it will stand considerable pressure. A conical baffle 23 is provided in the still 2 under which a vapor outlet pipe projects, this vapor outlet pipe passing through the wall 1 to the dephlegmator 3. Surrounding the bottom of the still 2 near the burner 11 is a liquid heating coil 25 which terminates in an injection nozzle 26, the heating coil 25 being fed through a pipe 27 which projects through the side of the furnace and through valves 28 and 29 to the injector 5. The dephlegmator 3 may be of any suitable form, that shown consisting of a plurality of small diameter pans 31 and large diameter pans 32, these pans alternating and being separated by small spaces. The pans 32 are provided with a central opening 33, the periphery of these pans fitting tightly in the shell of the dephlegmator 3. The pans 31 are not perforated but are smaller in diameter than the dephlegmator 3, leaving a space around the edge through which the vapors may ascend. The dephlegmator 3 is provided with a coned bottom 34 and with a liquid outlet pipe 35 having a valve 36, the pipe 35 communicating with the injector 5. A vapor outlet pipe 37 connects with the top of the dephlegmator 3, being provided with a valve 38 and being connected into a lower header 41 of the condenser 4.

The condenser 4 consists of a lower header 41 and an upper header 42, these headers being connected by tubes 43 which are surrounded by a shell 44 which forms a water space between the headers 41 and 42 around the tubes 43. Water is delivered to this space through a pipe 45 and taken off through a pipe 46. Gas is taken off from the top of the upper header 42 through a gas line 47 having a valve 48 and condensates are taken off from the bottom header 41 through a pipe 49 having a suitable valve 491. The injector 5 is fed with steam through a pipe 51, this steam being delivered to a nozzle 52 which projects into a space inside the injector into which liquid is delivered by the pipe 35. A drain or blowout pipe 54 is provided with a valve 55 in the pipe 27 between the valves 28 and 29.

The method of operation is as follows:

The still 2 being charged with broken lignite, for example, through the upper portion thereof, the door 21 being open for the purpose and the cover 22 being secured in place, the cover 21 is closed and sealed. The lignite in falling strikes upon the baffle 23 and is forced outwardly, leaving an open space 100 under the baffle in which gas can collect. The valves 55 and 36 being closed, steam is admitted through a valve 56 through the pipe 51 and passes through the injector and through the valves 28 and 29 which are open. Under these conditions there is no injector action, since no liquid is supplied to the injector, the steam passing readily therethrough and through the pipe 27 and the coil 25 to the nozzle 26. A small fire is maintained at the gas burner 11 principally for the purpose of preventing heat losses, since the steam is depended upon almost entirely for the heating effect. This steam which may be superheated passes upwardly through the mass of lignite 101 in the still 2, thoroughly heating the same and supplying moisture thereto.

In practice, I prefer to keep the valve 38 or the valves 491 and 48 partially closed so that a considerable pressure is maintained inside the still 2, the dephlegmator 3, and in some cases in the condenser 4, the pressure inside the still building up for this reason until a pressure of, say, eighty pounds per square inch is reached. The steam, after passing through the material 101, passes into the dephlegmator 3 and through the dephlegmator 3 into the tubes 43 of the condenser 4, in which the steam may be condensed, passing off as a condensate through the pipe 49. At the beginning of the operation, the steam carries with it very few hydrocarbon values, but as the temperature of the mass 101 rises and the pressure increases, distillation from the carbonaceous material starts to take place and the steam vapors carry with them various hydrocarbon oil fractions in the form of vapor. These vapors pass with the steam upwardly through the dephlegmator 3, which is externally cooled and in which some condensation takes place. The temperature of the dephlegmator is kept such that any oil vapors of higher boiling point than the desired low boiling point vapors produce a heavy oil which settles in the bottom of the dephlegmator 3 and which can be removed by opening the valve 36 and allowing this liquid to flow into the injector which pulls it from the pipe 35 into the injector and forces it through the pipe 27 and through the heating coil 25 into the mass of material 101 in the still.

During the later portion of the operation, the valve 36 is partially open all the time and the liquid is withdrawn from the dephlegmator as fast as it is condensed therein. Due to the dephlegmator 3, no high boiling point fractions can pass into the pipe 37, the dephlegmator serving to automatically separate out all heavy or tarry substances which may come over as a vapor. These heavy tarry substances are thoroughly mixed with steam in the injector 5 and are heated in the coil 25, being then injected into the heated material 101. In the case of high grade coal, this material consists almost wholly of coke; and in the case of lignite and other carbonaceous substance, it may consist largely of coke. This highly heated coke in the presence of steam acts upon the hydrocarbon vapors produced in the mass 101, either upon the initial distillation or upon the redistillation of the material returned from the bottom of the dephlegmator 3, tending to crack these hydrocarbon vapors forming free carbon or heavy carbonaceous substances and setting free a low boiling point vapor which passes over through the vapor pipe 24 and which passes freely through the dephlegmator 3 into the condenser 4. Treating certain carbonaceous substances, such, for example, as peat or lignite, during the initial stages of the distillation, considerable quantities of ammonium chloride pass over, this ammonium chloride and the condensed water being delivered in the condensates delivered by the pipe 49. As the distillation progresses, the yield of the ammonium chloride falls and the condensates delivered by the pipe 49 consist of water and low boiling point hydrocarbons. Any fixed gases which may be formed which are incondensable in the condenser 4 pass off through the pipe 47 and may be utilized to furnish heat for the process or may be otherwise utilized if desired. Whenever the material in the still 2 has been sufficiently treated so that practically no more vapors can be taken off, the steam is shut off by means of the valve 56, the apparatus is allowed to cool and the spent material is removed by opening the door 22. The process may then be repeated.

The temperatures and pressures employed in my process are mutually dependent upon each other and vary with the material to be treated. The higher the pressure in the retort 2, the lower the temperature required. In the treatment of shale or lignite, the temperature in the retort must be sufficient to drive off the volatiles and crack the condensates returned thereto. This will, in most cases, require that the interior of the still shall have a temperature of at least 400 degrees Fahrenheit and a useful working temperature must be assumed of about 700 degrees Fahrenheit. The steam introduced through the nozzle 26 must be much hotter and I have found that a temperature of 1400 degrees Fahrenheit is desirable.

I claim as my invention:

1. A process for the distillation of coal which comprises treating it in a closed retort with superheated steam under a pressure of not less than five pounds, leading off the steam and volatile products, condensing desired fractions thereof separately, and collecting the remaining gas for use as desired.

2. A process for the distillation of coal which comprises treating it in a closed retort with superheated steam under a pressure of not less than five pounds, leading off the products of distillation in suspension, and automatically condensing the products in desired fractions.

In testimony whereof, I have hereunto set my hand at Los Angeles, California, this 28th day of March, 1924.

MILON J. TRUMBLE.